(12) United States Patent
Martensson et al.

(10) Patent No.: US 10,346,015 B2
(45) Date of Patent: Jul. 9, 2019

(54) TRANSPARENT FUEL DISPENSER

(71) Applicant: Wayne Fueling Systems LLC, Austin, TX (US)

(72) Inventors: Mattias G. Martensson, Kavlinge (SE); Bengt I. Larsson, Skivarp (SE); Gustaf Gustafsson, Malmo (SE); Henrik Kjellberg, Malmo (SE)

(73) Assignee: Wayne Fueling Systems LLC, Austin, TX (US)

( * ) Notice: Subject to any disclaimer, the term of this patent is extended or adjusted under 35 U.S.C. 154(b) by 166 days.

(21) Appl. No.: 15/476,218

(22) Filed: Mar. 31, 2017

(65) Prior Publication Data

US 2017/0344233 A1 Nov. 30, 2017

Related U.S. Application Data

(60) Provisional application No. 62/349,513, filed on Jun. 13, 2016, provisional application No. 62/342,410, filed on May 27, 2016.

(51) Int. Cl.
| | |
|---|---|
| *G06F 3/0484* | (2013.01) |
| *B67D 7/04* | (2010.01) |
| *B67D 7/14* | (2010.01) |
| *B67D 7/22* | (2010.01) |
| *G06F 3/0482* | (2013.01) |

(Continued)

(52) U.S. Cl.
CPC ........... *G06F 3/04845* (2013.01); *B67D 7/04* (2013.01); *B67D 7/14* (2013.01); *B67D 7/22* (2013.01); *G06F 3/0482* (2013.01); *G06F 21/32* (2013.01); *B67D 2007/044* (2013.01); *B67D 2007/0442* (2013.01); *G06F 21/84* (2013.01); *G06F 2203/04804* (2013.01)

(58) Field of Classification Search
CPC .... G06F 3/04845; G06F 3/0482; G06F 21/32; G06F 21/84; G06F 2203/04804; B67D 7/04; B67D 7/14; B67D 7/22; B67D 2007/044; B67D 2007/0442
See application file for complete search history.

(56) References Cited

U.S. PATENT DOCUMENTS

| 6,052,629 A | 4/2000 | Leatherman et al. |
|---|---|---|
| 6,070,156 A | 5/2000 | Hartsell, Jr. |
| 6,098,879 A | 8/2000 | Terranova |

(Continued)

FOREIGN PATENT DOCUMENTS

| CN | 203250486 U | 10/2013 |
|---|---|---|
| WO | WO-2012088034 A2 | 6/2012 |

OTHER PUBLICATIONS

English translation of CN203250486 date Oct. 23, 2013 Author Yong et.al (Year: 2013).*

(Continued)

*Primary Examiner* — Mandrita Brahmachari
(74) *Attorney, Agent, or Firm* — Mintz Levin Cohn Ferris Glovsky and Popeo, P.C.

(57) ABSTRACT

In general, transparent fuel dispensers are provided, and in particular methods and devices are provided for increasing visibility on a fuel dispensing device. In one embodiment a fuel dispenser is provided having a display that is at least partially transparent at least during certain modes of operation. The display can display information on portions thereof during certain modes of operation as well.

26 Claims, 11 Drawing Sheets

(51) Int. Cl.
*G06F 21/32* (2013.01)
*G06F 21/84* (2013.01)

(56) References Cited

U.S. PATENT DOCUMENTS

| | | |
|---|---|---|
| 6,152,591 A | 11/2000 | McCall et al. |
| 6,275,746 B1 | 8/2001 | Leatherman et al. |
| 6,380,853 B1 | 4/2002 | Long et al. |
| 6,381,514 B1 | 4/2002 | Hartsell, Jr. |
| 6,422,464 B1 | 7/2002 | Terranova |
| 6,493,440 B2 | 12/2002 | Gromatzky et al. |
| 6,574,603 B1 | 6/2003 | Dickson et al. |
| 6,690,275 B2 | 2/2004 | Long et al. |
| 6,734,798 B2 | 5/2004 | Smith |
| 6,741,909 B2 | 5/2004 | Leatherman et al. |
| 6,882,900 B1 | 4/2005 | Terranova |
| 7,604,169 B2 | 10/2009 | Demere |
| 7,810,722 B2 | 10/2010 | Dodson |
| 7,948,376 B2 | 5/2011 | DeLine |
| 8,284,053 B2 | 10/2012 | DeLine |
| 8,554,688 B2 | 10/2013 | Harrell et al. |
| 8,761,924 B2 | 6/2014 | Leatherman et al. |
| 8,965,569 B2 | 2/2015 | Siler |
| 9,120,664 B2 | 9/2015 | Birkler et al. |
| 9,139,414 B2 | 9/2015 | Bergqvist |
| 2003/0028285 A1* | 2/2003 | Zura ............... G06Q 10/08 700/241 |
| 2005/0000588 A1 | 1/2005 | Webb et al. |
| 2009/0048706 A1 | 2/2009 | DeLine |
| 2010/0017040 A1 | 1/2010 | Shuler |
| 2015/0329349 A1 | 11/2015 | Larsson et al. |
| 2016/0018923 A1 | 1/2016 | Zhang et al. |

OTHER PUBLICATIONS

International Search Report and Written Opinion for PCT Application No. PCT/US2017/025442 dated Jun. 20, 2017.
Fujitsu. PalmSecure. Dated no later than Jun. 11, 2016. <http://www.fujitsu.com/us/solutions/business-technology/security/palmsecure/>.
Mims, C. The Wallet in Your Skin. Scientific American. Dec. 2011.
Trader, J. The Top 5 Reasons to Consider Fujitsu PalmSecure Biometric Technology Over Fingerprint. M2SYS Blog on Biometric Technology. Jun. 10, 2011. <http://www.m2sys.com/blog/vascular-biometrics/the-top-5-reasons-you-should-consider-fujitsu-palmsecure-biometric-technology-over-fingerprint/>.
U.S. Appl. No. 15/476,112 entitled "Intelligent Fuel Dispensers" filed Mar. 31, 2017.

* cited by examiner

TRANSPARENT FUEL DISPENSER

CROSS REFERENCE TO RELATED APPLICATIONS

The present application claims priority to U.S. Provisional Patent Application No. 62/342,410 entitled "Transparent Fuel Dispenser" filed on May 27, 2016 and to U.S. Provisional Patent Application No. 62/349,513 entitled "Intelligent Fuel Dispensers" filed on Jun. 13, 2016, which are hereby incorporated by reference in their entireties.

FIELD

Fuel dispensers having a transparent display are provided, as well as methods for providing and using a transparent display.

BACKGROUND

Many fuel dispensers used today in fueling stations are large and bulky. The fuel dispensers often have increased size due to screens displaying media and other advertisements attached to the fuel dispenser. As a result of these large, bulky machines, it is possible for people to hide or lurk out of sight on one side of a fuel dispenser while a driver uses the fuel dispenser on the other side. This lack of visibility can allow people to conduct various illegal activities close to a driver while still being out-of-sight of the driver, such as "sniffing" credit card information from the driver by illegally accessing the fuel dispenser to steal credit card information provided to the fuel dispenser by the driver or attacking the driver after being able to remain unseen close by.

Making a fuel dispenser smaller to increase visibility and reduce chances of illegal activity is often not possible. For example, many fuel dispensers include large media displays that provide a method of communication between drivers and companies, providing information, advertisements, notices, and a host of other important and valuable information. Additionally the equipment used in a fuel dispenser is often large and bulky itself, thus making it impractical to increase visibility around a fuel dispenser and throughout a fueling station forecourt simply by reducing the size of fuel dispensers.

Accordingly, there remains a need for improving visibility in the vicinity of a fuel dispenser.

SUMMARY

Various transparent display devices and methods, particularly for use on fuel dispenser devices, are provided. The methods and devices can improve user interaction and can provide a safe fuel station forecourt by allowing transparent displays in a fuel dispenser, among other advantages.

In one aspect, a fuel dispenser is provided including a housing with fuel dispensing components disposed therein. A control system is provided in the housing for controlling the dispensing of fuel. A graphical display is located on the housing. The graphical display can have a transparent mode in which at least a portion of the display is transparent to allow viewing from a front of the housing, through the display, to a rear of the housing. The graphical display can also have a media mode in which graphical information is present on the display and is visual to a user.

The fuel dispenser can be varied in a number of ways. For example, the graphical display can be configured to transition between the transparent mode and the media mode in response to a trigger. The trigger can be a touch screen on the graphical display that, when touched, causes the graphical display to transition from the transparent mode to the media mode. In still another example, the trigger can be a fixed amount of time after a last interaction between a customer and the fuel dispenser that, when activated, causes the graphical display to transition from the media mode to the transparent mode. In yet another example, the trigger can be any one of a button on the fuel dispenser, a switch on the fuel dispenser, a keyboard on the fuel dispenser, a motion sensor, a pressure sensor, a sound sensor, a video camera, and a payment device on the fuel dispenser that, when touched, causes the graphical display to transition from the transparent mode to the media mode. In still another example, the graphical display can include a front graphical display on a front side of the fuel dispenser, the fuel dispenser can include a rear graphical display on a back side of the fuel dispenser, and the front and rear graphical displays can be configured to allow an unobstructed view therethrough when the front and rear graphical displays are in the transparent mode. In yet another example, a curtain can be located in the housing and can be configured to extend behind the graphical display in the media mode and retract in the transparent mode.

In another example, the fuel dispenser can include a biometrics reader and can include a processor configured to receive biometrics data from the biometrics reader, configured to determine identity information of a customer using the biometrics data, and configured to cause the fuel dispenser to perform an action using the identity information. The biometrics reader can be configured to read at least one of a fingerprint, an eye pattern verification, a palm print, DNA, hand geometry, and vein pattern. The processor can be configured to transmit the biometrics data to a remote database for determining whether the biometrics data matches a customer identity, or the processor can be configured to determine whether the biometrics data matches a customer identity. Based on the determined identity information of the customer, a characteristic of the customer including at least one of age, height, gender, and disability status can be identified. The processor can be configured to dynamically reconfigure at least one graphical user interface (GUI) element in the graphical display, and the GUI element can have at least one of a reconfigured location and a reconfigured size determined using the determined characteristic of the customer. The processor can be configured to provide the determined identity information of the customer to a remote processor for determining the customer's identity that includes a name or unique identifier.

In another aspect, a fuel dispenser for dispensing fuel to a vehicle is provided that includes a housing with a mechanical base portion including at least one fuel dispensing component comprising a motor, a pump, and a meter to control the dispensing of fuel. An electronic head is also provided that includes a processor to control the fuel dispensing component. A front graphical display and a rear graphical display are provided and are located on the housing. The displays are configured to selectively display media. The displays are also configured to be simultaneously transparent to allow viewing from a front of the housing, through the front graphical display and the rear graphical display, to a rear of the housing.

The fuel dispenser can be varied in a number of ways. For example, the media can be displayed on a portion of the front and rear graphical displays, and a portion of the front and rear graphical displays can be transparent. In another example, the fuel dispenser can include a trigger to cause the front and rear graphical displays to become transparent. In still another example, the fuel dispenser can have at least one curtain in the electronic head that is configured to prevent viewing from the front of the housing, through the front graphical display and the rear graphical display, to the rear of the housing when the front and rear graphical displays are displaying media. The at least one curtain can also be configured to allow viewing from the front of the housing, through the front graphical display and the rear graphical display, to the rear of the housing when the front and rear graphical displays are simultaneously transparent.

In another aspect, a method of interacting with a fuel dispenser display is provided that includes activating a fuel dispenser to cause a graphical display on the fuel dispenser to display media. Activation can also cause the fuel dispenser to dispense fuel. At least a portion of the graphical display is transparent to allow viewing through the dispenser when no media is being displayed.

The method can have numerous variations. For example, activating the fuel dispenser can include activating a trigger to cause the graphical display to display media. Activating the trigger can include, for example, touching a touch screen on the graphical display.

In still another aspect, a method of interacting with a fuel dispenser display is provided that includes receiving an input from a user, the input activating a graphical display on the fuel dispenser to display media. The graphical display is transparent to allow viewing through the dispenser when no media is being displayed.

The method can have a number of variations. For example, receiving input from the user can include receiving information from a payment device on the fuel dispenser. In another example, receiving input from the user can include receiving information from a touch screen on the fuel dispenser. In still another example, activating the fuel dispenser can activate a curtain that blocks a back of the graphical display when displaying media, and the curtain can retract into the fuel dispenser when the graphical display is transparent.

Non-transitory computer program products (e.g., physically embodied computer program products) are provided that store instructions, which when executed by one or more data processors of one or more computing systems, causes at least one data processor to perform operations herein. Similarly, computer systems are also provided that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

This invention will be more fully understood from the following detailed description taken in conjunction with the accompanying drawings, in which.

DETAILED DESCRIPTION

Figure 1:
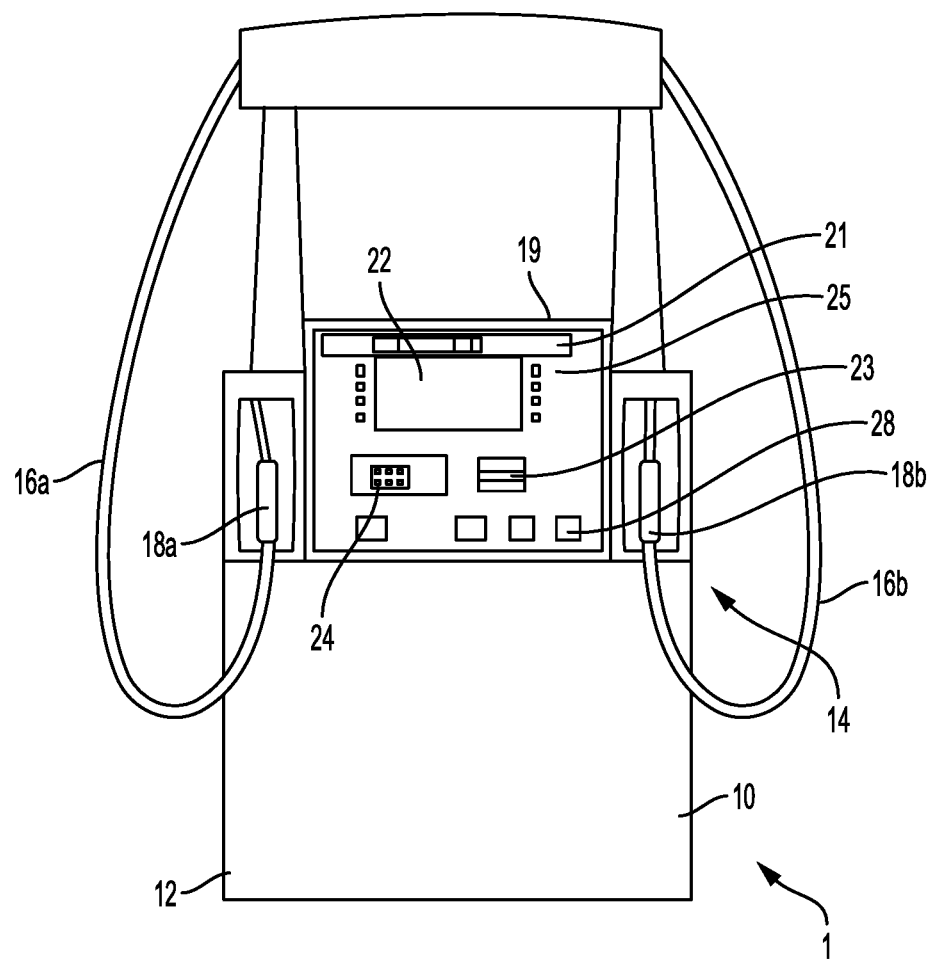
FIG. 1 is a front view of one embodiment of a fuel dispenser.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and the components thereof, can depend at least on the anatomy of the subject in which the systems and devices will be used, the size and shape of components with which the systems and devices will be used, and the methods and procedures in which the systems and devices will be used. Like reference symbols in the various drawings indicate like elements.

In certain embodiments, methods and devices are provided for increasing visibility on a fuel dispensing device. In an exemplary embodiment, the methods and devices are used in fuel dispensing devices for providing fuel to a vehicle. However, the methods and devices can be utilized in any fuel dispensing device.

In one exemplary embodiment, a fuel dispenser is provided that generally includes a housing containing various components for dispensing fuel. The housing can include a graphical display located for outputting information to a customer. The information can include both audio and video information, such as advertisements, local area content, notifications, and a variety of other information, and the fuel dispenser can also include sound for the display that can be adjusted on a sliding scale. At least a portion of the display can be selectively transparent. For example, at least a portion of the display can be transparent when not in use and can display media when in use by a customer. The display can be configured to be transparent in a variety of situations to provide a safer environment, such as a safer and more open fuel station forecourt when a customer is using the fuel dispenser. The customer can be safer because the at least partially transparent display can allow the customer to visually see through the fuel dispenser, allowing the customer to see people behind the dispenser potentially intending to do harm (such as financial, informational, and/or physical harm) to the customer. The fuel dispenser can also provide a large display for displaying a variety of media to the customer without risking the customer's safety. A fueling station forecourt can be as open as possible while still having very large displays on any fuel dispensers located in the fueling station forecourt. The fuel dispenser can also effectively allow for more branding and/or advertisements. Physical items can be placed in a space behind the display, allowing the physical items to be visible when the display is transparent. Other branding, informational, and/or commercial approaches are possible, as well, such as stickers on, behind, and/or around the transparent display and projected media within the space behind the display.

FIG. 1 illustrates one embodiment of a fuel dispenser 1 that generally includes a housing base 10 and an electronic portion 19 (e.g. an "electronic head"), each having a front side 12 and a back side 14. While only the front side 12 is discussed herein, the back side 14 can also have similar features including a transparent display to allow viewing through the front and back sides of the dispenser. In general, the housing base 10 contains fuel dispensing components for transportation of fuel to one of more hoses and nozzles. For instance, a "self-contained" fuel dispenser can have an electric motor, a pumping unit, meters, pulsers, and/or valves to physically pump and control fuel flow. In such an example, the fuel dispenser can use a suction pump. In another example, a submersible pump fuel dispenser can have a pump that is sealed and immersed inside fuel tanks on site. All such variations of fuel dispensing components can be used in the present fuel dispensers. A control system (not shown) can be disposed in the housing and is coupled to the fuel dispensing components for controlling the delivery of fuel. The illustrated dispenser 1 also has two hoses 16a, 16b on the front side, each having a nozzle 18a, 18b located at a terminal end of the hose 16a, 16b. Additional hoses can be present on the back side. A person skilled in the art will appreciate that the fuel dispenser 1 can have any number of hoses. The electronic head 19 can also have a variety of configurations and can contain a computer to control actions of the fuel dispenser, contain and control any graphical displays, and communicate with any external systems (such as a point of sale (POS) system). The electronics portion 19, which is disposed on the housing base 10 and is coupled to the control system, can include a processor and it can control the components in the housing base 10 through the control system, allowing fuel to be dispensed via each nozzle 18a, 18b. The illustrated electronics portion 19 has a price and volume display 21 that presents information concerning the price and volume of any fuel being dispensed, and a graphical display 22 that presents a user interface for displaying information to a customer and/or for interacting with a customer. The illustrated electronics portion 19 also has a keypad 24 and buttons 25 that allow a customer to interact with the electronics portion 19, a payment device 26 that allows the customer to pay for purchases, and grade selection buttons 28 that allow the customer to select the grade of fuel to be dispensed by the fuel dispenser 1. While only one fuel dispenser 1 is shown, one or more fuel dispensers 1 can be grouped together in a single location. Additionally, the fuel dispenser 1 can contain more than one hose and nozzle combination. For example, two, four, or eight hoses and two, four, or eight nozzles can be provided for use on the front side 12 of the housing base 10 while two, four, or eight hoses and two, four, or eight nozzles can be provided for use on the back side 14. A person skilled in the art will further appreciate that the fuel dispenser can have a variety of configurations and the illustrated dispenser configuration is merely representative of one type of fuel dispenser.

As indicated above, the graphical display 22 is located on the electronics portion 19 on the front side 14 of the dispenser 10. The graphical display 22 presents information to a customer in the form of audio and/or video. The information presented can be any information capable of being reduced to audio and/or video. For example, the information can present commercials with synchronized audio and video used to promote products. The information can be arranged in any streaming format. For example, the information can be a continuous stream of audio and video, a predetermined loop of audio and video that repeats continuously, or a predetermined loop of audio and video that plays once and stops. The information can be synchronized across multiple fuel dispensers 1 in one location or multiple locations. The information can also be individualized to one fuel dispenser 1. The information can play continuously or can be triggered to play by an event, for example by an interaction between the customer and the fuel dispenser 1.

In one embodiment, the graphical display 22 can be interactive with the customer by incorporating a touch screen. The touch screen can be electronically coupled to the graphical display 22 and can overlay the graphical display 22 to allow the customer to interact with the graphical display 22. The graphical display 22 can provide graphics prompts, which the customer can actuate by touching the corresponding location on the touch screen. While the graphical display 22 uses a touch screen, any type of input device can be used to allow the customer and the graphical display 22 to interact. For example, the electronics portion and/or housing and/or the graphical display 22 can contain one or more buttons, switches, keyboards, motion sensors, pressure sensors, sound sensors, and/or video cameras electronically coupled to the graphical display 22 directly and/or wirelessly. A person skilled in the art will appreciate that various components, such as the electronics portion 19, the keypad 24, the buttons 25, and the grade selection buttons 28 can be incorporated into the graphics display so as to eliminate the need for a separate component.

In one embodiment, the graphical display 22 can transition between a transparent and a substantially opaque mode in which various media is displayed. When the graphical display 22 is not in use by a customer, the graphical display 22 is preferably transparent, thus allowing the customer to see through the graphical display 22 to the back side 14 of the fuel dispenser 1. The fuel dispenser 1 is thus more open and safe because a customer can visually confirm that a person is not hiding behind the fuel dispenser 1. When the customer engages with the graphical display 22, e.g., by touching the touch screen of the graphical display 22 or lifting the nozzle 18a, 18b out of the nozzle boot, the graphical display can begin displaying various media. The media can be present on all or a portion of the screen, as may be desired.

In one embodiment, the graphical display can be electronically coupled to a trigger. Activation of the trigger can activate the graphical display, causing the graphical display to transition from the transparent mode to a media mode in which media and/or other information is displayed. As noted above, triggering the graphical display 22 to transition from transparent mode to media mode can be caused by touching the touch screen or by any number of other events. For example, the trigger can be an actuation of one or more buttons, switches, keyboards, motion sensors, pressure sensors, sound sensors, and/or video cameras placed on or surrounding fuel dispenser 1. The trigger can also be actuated by payment by the customer using the payment device 26.

Figure 2:
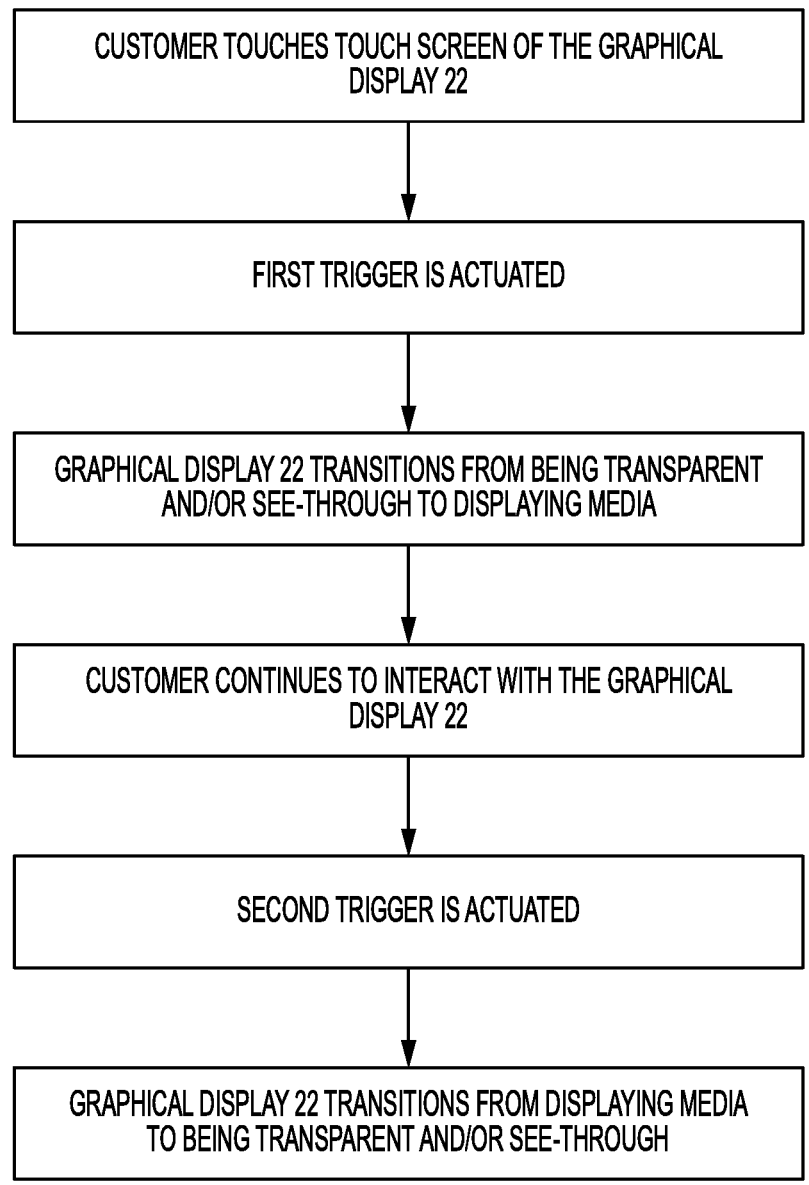
FIG. 2 is a schematic illustrating one exemplary process flow for the fuel dispenser of FIG. 1.

In one exemplary embodiment shown in FIG. 2, the customer touches the touch screen of the graphical display 22. This touch by the customer of the touch screen of the graphical display 22 acts as a first trigger, the actuation of which causes the graphical display 22 to transition from a transparent mode to a state of displaying media to the customer. As the customer continues to interact with the graphical display 22, the graphical display 22 continues to display information and/or media to the customer. However, upon actuation of a second trigger, the graphical display 22 stops displaying information and/or media and transitions back to transparent mode. The second trigger can be any of the triggers discussed previously, such as actuation of one or more buttons, switches, keyboards, motion sensors, pressure sensors, sound sensors, video cameras placed on or surrounding fuel dispenser 1, and/or payment by the customer using the payment device 26. The second trigger can also be a variety of actions signaling an end of the interaction between the customer and the graphical display 22 and/or the fuel dispenser 1, such as successful processing of payment, printing of a receipt, or display of a departing message by the graphical display 22. The second trigger can also be a predetermined time since a last interaction between a customer and the fuel dispenser, such as a 30 second, 1 minute, 2 minute, or 3 minute period during which the customer does not interact with the fuel dispenser 1. In some scenarios, the graphical display can be transparent when the graphical display and/or the fuel dispenser is idle.

As indicated above, in other embodiments only a portion of the display can transition between transparent mode and media mode. For example, in some embodiments a portion of the graphical display can be dedicated to displaying media, such as displaying advertisements, and another portion of the graphical display can be dedicated to interacting with a customer. In such an embodiment, the portion dedicated to interacting with the customer can transition to being transparent after the customer has completed their transition while the portion dedicated to displaying media can continue to display media at all times or at select times, such as when the customer is still present but has finished their transaction. The portions dedicated to each activity can vary, such as 50% being dedicated to media and 50% being dedicated to interacting with the customer, 25% being dedicated to media and 75% being dedicated to interacting with the customer, or 75% being dedicated to media and 25% being dedicated to interacting with the customer. In other embodiments, the graphical display can have a portion that is always transparent and a portion that displays media and/or interacts with the customer. In various embodiments, the graphical display can have a state in which the entirety of the graphical display is transparent, a state in which the entirety of the graphical display displays media and/or interacts with the customer, and a state in which a portion of the graphical display is transparent and another portion of the graphical display displays media and/or interacts with the customer. The graphical display can be configured to transition back and forth between these varied states in any order.

A degree to which the graphical display 22 is transparent can also vary. While the graphical display 22 is almost entirely transparent, other embodiments can vary from being entirely transparent to being partially transparent by a decree that allows visibility therethrough.

The graphical display 22 can only display media in one direction, toward the front side 12 of the fuel dispenser 1. If the back-side of the dispenser contains a second graphical display, the second graphical display can be configured similar to the front graphical display 22 so as to allow the customer to see through both displays without having their view obscured. In other embodiments, a single graphical display can be used to display media in both directions, thus allowing the single graphical display to serve both directions without requiring a second graphical display.

Figure 3:
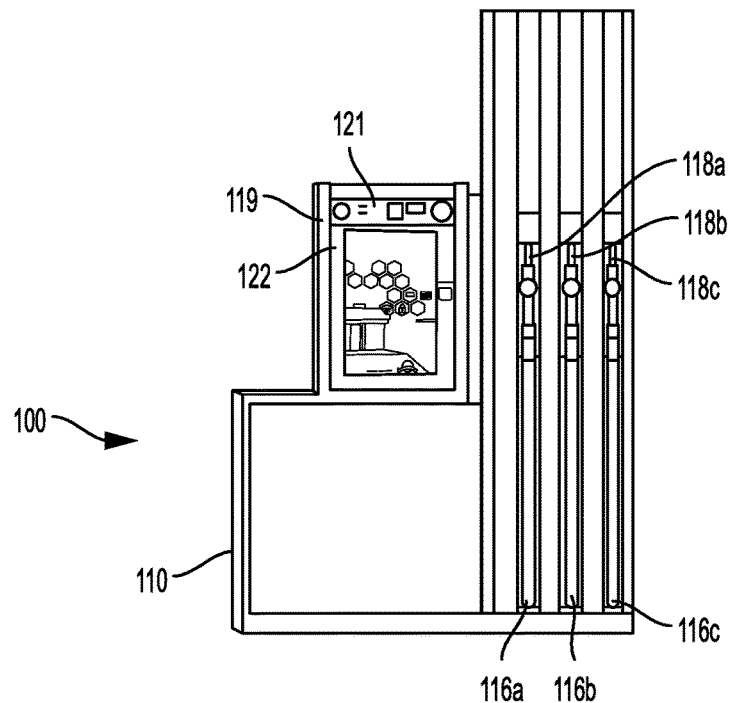
FIG. 3 is a front view of another embodiment of a fuel dispenser.
Figure 4:
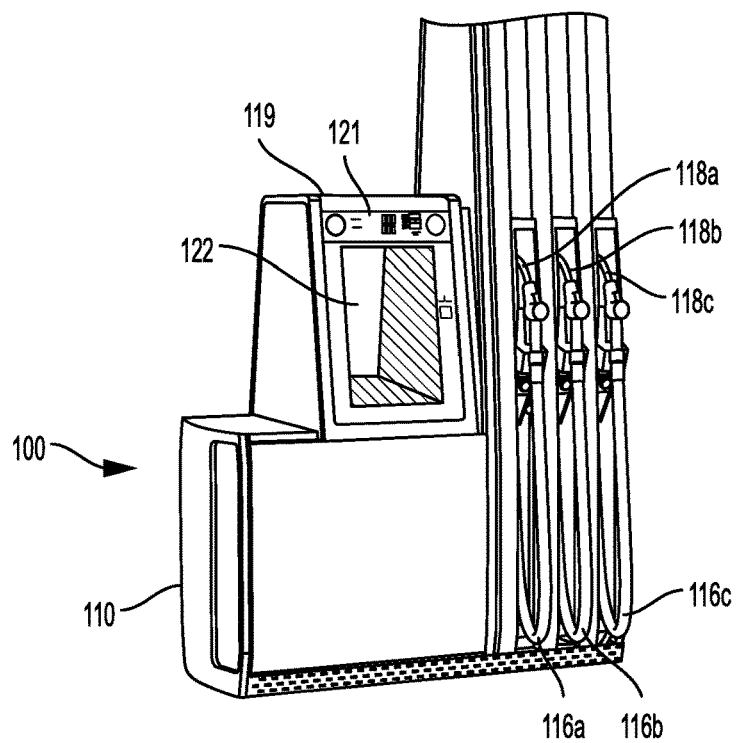
FIG. 4 is a perspective view of the fuel dispenser of FIG. 3.

FIGS. 3-4 illustrate another embodiment of a fuel dispenser 100 similar to the fuel dispenser 1 and that generally includes a housing base 110. In general, the housing base 110 contains fuel dispensing components for transportation of fuel to one of more hoses and nozzles. The illustrated dispenser 100 has three hoses 116a, 116b, 116c, each having a nozzle 118a, 118b, 118c located at a terminal end of the hose 116a, 116b, 116c. Another set of three hoses and nozzles can be located on the back side of the dispenser 100. The fuel dispenser 100 can, however, have any number of hoses and nozzles. A control system (not shown) can be disposed in the housing base 110 and coupled to the fuel dispensing components. An electronics portion 119 is disposed on the housing base 110 and is coupled to the control system. The electronics portion 119 can include a processor and it can control the fuel dispensing components in the housing base 110 through the control system, allowing fuel to be dispensed via each nozzle 118.

The illustrated electronics portion 119 has a price and volume display 121 that presents information concerning the price and volume of any fuel being dispensed, and a graphical display 122 that presents a user interface for displaying information to a customer and/or for interacting with a customer. A person skilled in the art will further appreciate that the fuel dispenser can have a variety of configurations and the illustrated dispenser configuration is merely representative of one type of fuel dispenser. For example, a person skilled in the art will appreciate that various components, such as electronics portion(s), keypad(s), button(s), and grade selection button(s) can be incorporated into the graphics display so as to eliminate the need for separate component(s). In other words, the entire front facing portion of the electronics head can be in the form of a display screen, and no physical buttons or other hardware components can be present on the dispenser, with the exception of a biometric reader, Bluetooth tap reader, or one or more other readers to communicate with the customer. The graphical display 122 can present information to a customer in the form of audio and/or video. The information presented can be any information capable of being reduced to audio and/or video. For example, the information can present commercials with synchronized audio and video used to promote products. The information can be arranged in any streaming format. For example, the information can be a continuous stream of audio and video, a predetermined loop of audio and video that repeats continuously, or a predetermined loop of audio and video that plays once and stops. The information can be synchronized across multiple fuel dispensers 100 in one location or multiple locations. The information can also be individualized to one fuel dispenser 100. The information can play continuously or can be triggered to play by an event, for example by an interaction between the customer and the fuel dispenser 100.

The graphical display 122 can be interactive with the customer by incorporating a touch screen therewith. The graphical display 122 can provide graphics prompts, which the customer can actuate by touching the corresponding location on the touch screen. At least part of the graphical display 122 can transition between a transparent mode and a substantially opaque mode in which various media is displayed. Portions of the graphical display 122 can be transparent while other portions of the graphical display 122 can display media and/or interact with a customer, as can be seen in FIG. 4. When the graphical display 122 is not in use by a customer, as shown in FIG. 4, the substantial entirety of the graphical display 122 can be preferably transparent, thus allowing the customer to see through the graphical display 122 to an opposite side of the fuel dispenser 100. The fuel dispenser 100 is thus more open and safe because a customer can visually confirm that a person is not hiding behind the fuel dispenser 100. When the customer engages with the graphical display 122, e.g., by touching the touch screen or lifting the nozzle 118a, 118b, 118c out of the nozzle boot, the graphical display 122 can begin displaying various media, as shown in FIG. 3. The media can be present on all or a portion of the screen, as may be desired.

Triggering the graphical display 122 to transition from the transparent mode to the media mode in which media and/or other information is displayed can be caused by touching the touch screen, but as with the fuel dispenser 1 above, a trigger of the graphical display 122 can be any number of events.

An exemplary graphical display that can be used herein is LTI220MT02-V manufactured by Samsung, however a variety of different displays can be used. For example, a projector can be used that can project an image onto a surface, such as a piece of glass, a touch screen foil, or a variety of other surfaces. Such an example can also have similar features to those disclosed above, such as touch sensitivity.

Figure 5:
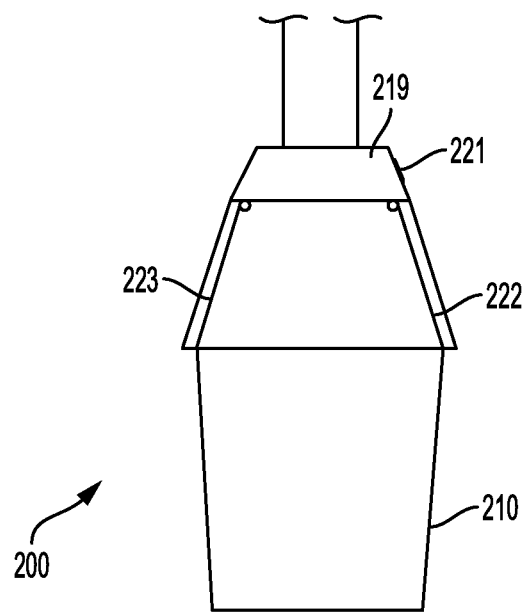
FIG. 5 is an end view of another embodiment of a fuel dispenser.

FIG. 5 is a side view of another embodiment of a fuel dispenser 200 similar to the fuel dispenser 1 and the fuel dispenser 100 and that generally includes a housing base 210. In general, the housing base 210 contains fuel dispensing components for transportation of fuel to one of more hoses and nozzles. A control system (not shown) can be disposed in the housing base 210 and is coupled to the fuel dispensing components. An electronics portion 219 and a price and volume display 221 are disposed on the housing base 210 and coupled to the control system. The electronics portion 219 can include a processor and it can control the fuel dispensing components in the housing base 210 through the control system, allowing fuel to be dispensed. In this embodiment, the fuel dispenser 200 has curtains 222, 223 that are movable up and down to improve graphical displays 225, 226. With two graphical displays 225, 226, visibility of content displayed on the graphical displays 225, 226 and backlighting can be improved when the curtains 222, 223 are in place. The curtains 222, 223 can be disposed internally and can roll down behind the graphical displays 225, 226 when the graphical displays 225, 226 are active, and the curtains 222, 223 can roll up and out of sight when the graphical displays 225, 226 are inactive and/or transparent. Transparency is thus maintained at appropriate periods while visibility of the content displayed is increased at appropriate periods.

Figure 6:
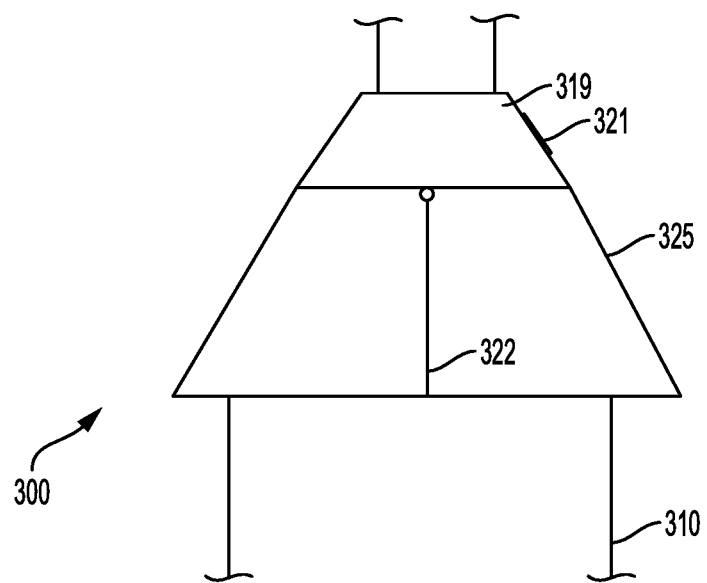
FIG. 6 is an end view of another embodiment of a fuel dispenser.

While two curtains are shown in FIG. 5, one or more curtains can be used with one or more graphical displays. Additionally, while the curtains are placed immediately behind the graphical displays in FIG. 5, placement of the curtain(s) can vary. For example, FIG. 6 illustrates another embodiment of a fuel dispenser 300 similar to fuel dispenser 200 and that generally includes a housing base 310 having fuel dispensing components for transportation of fuel to one of more hoses and nozzles. A control system (not shown) can be disposed in the housing base 310 and coupled to the fuel dispensing components. An electronics portion 319 and a price and volume display 321 are disposed on the housing base 310 and coupled to the control system. The electronics portion 319 can include a processor and it can control the fuel dispensing components in the housing base 310 through the control system, allowing fuel to be dispensed. The fuel dispenser 300 also has a single curtain 322 that is movable up and down to improve graphical display 325. As with the fuel dispenser 200, visibility of content displayed on the graphical display 325 and backlighting can be improved when the curtain 322 is in place. The curtain 322 in this embodiment is disposed internally and rolls down in a middle of the fuel dispenser 300 when the graphical display 325 is active, and the curtain 322 rolls up and out of sight when the graphical display 325 is inactive and/or transparent.

The curtains can vary in a number of ways. For example, the curtain(s) can roll, fall, drop, and otherwise move up and down in numerous ways. Additionally, the curtain can be used as a commercial, informational, and/or branding area similar to space behind the graphical displays. In some embodiments, a separate display can be projected onto the curtain(s), thus creating a visual effect of having multiple displays.

Figure 7:
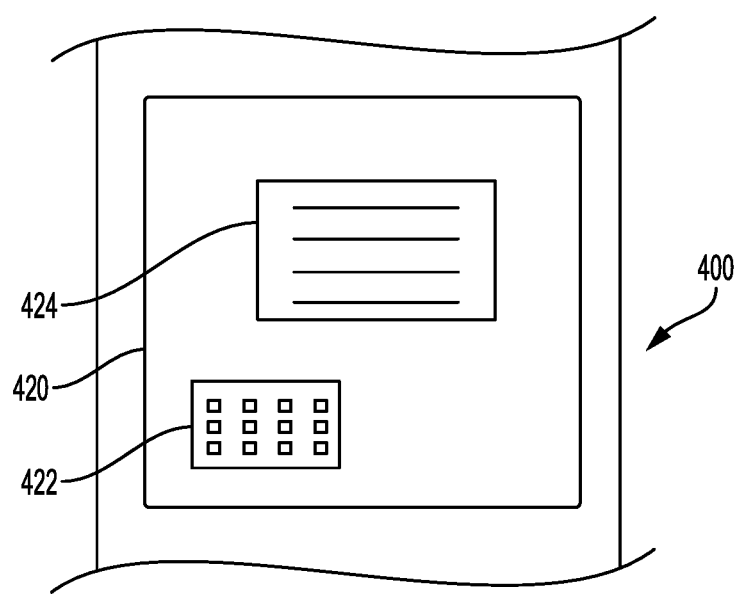
FIG. 7 is a front view of a display of another embodiment of a fuel dispenser.

FIG. 7 illustrates an embodiment of an electronics head 400 for use with any of the fuel dispensers disclosed herein. As shown, the electronics head 400 includes a graphical display 420 and a keypad 422. Media 424 is shown displayed on the graphical display 420 while a remaining portion of the graphical display 420 is blank and transparent.

In another embodiment, a fuel dispenser, such as the fuel dispenser 1 of FIG. 1, the fuel dispenser 100 of FIGS. 3-4, and other embodiments of fuel dispensers described herein, can include a reader for communicating with a customer, such as a Bluetooth tap reader, a biometric reader for reading a biometric feature of a customer, etc. The reader can allow for identification of the customer based on information gathered by the reader, e.g., the information gathered by the reader uniquely identifying the customer among a plurality of customers each having pre-stored unique identifying information associated therewith such as in a database or electronic library. The customer's identity can be used to automatically cause one or more actions to be performed. For example, the customer's fueling preferences (e.g., preferred fuel grade, fuel type, payment method, loyalty rewards identifier, whether to apply loyalty rewards to a present purchase, whether to purchase a car wash, and the like) can be identified as pre-stored preferences for the customer, and one or more of the customer's fueling preferences can be displayed on the fuel dispenser's display screen, on the customer's mobile device, and/or on a display screen of the customer's vehicle to facilitate a convenient, fast fueling transaction. For another example, the customer's identity can be used to provide customized or targeted advertisements and content to the fuel dispenser for provision to the customer during fueling, e.g., by displaying the advertisements and content on the fuel dispenser's display screen and/or on a display screen of the customer's vehicle. For yet another example, the customer's identity can be used to identify customer-related data that can, for example, be associated with a customer identifier (e.g., a credit card number, a personal identification number (PIN), a telephone number, a radio frequency identifier (RFID) number, or a loyalty program number). The customer-related data can be information regarding a fueling session (e.g., a type of fuel, a display language for the fuel dispenser display, audio settings for the fuel dispenser, or payment preferences (e.g., certain credit card, certain debit card, cash to be paid at a staffed payment terminal, etc.)), data regarding services at the fueling facility (e.g., car wash, air pump, or water hose), or data regarding the customer (e.g., address and preferred payment types). In at least some implementations, the customer-related data can be used to identify other information that may be of interest to the customer such as particular types of merchandise (e.g., drinks, newspapers, or food) or offers (e.g., coupons or advertising) that can be presented on a display screen to the customer based on customer-related data (e.g., based on the customer's past purchases). Methods, devices, and systems for identifying a customer and for using the identity of a customer to perform certain actions related to fuel dispensing are further described in U.S. application Ser. No. 15/476,112 entitled "Intelligent Fuel Dispensers" filed on Mar. 31, 2017, which is herein incorporated by reference in its entirety.

Figure 8:
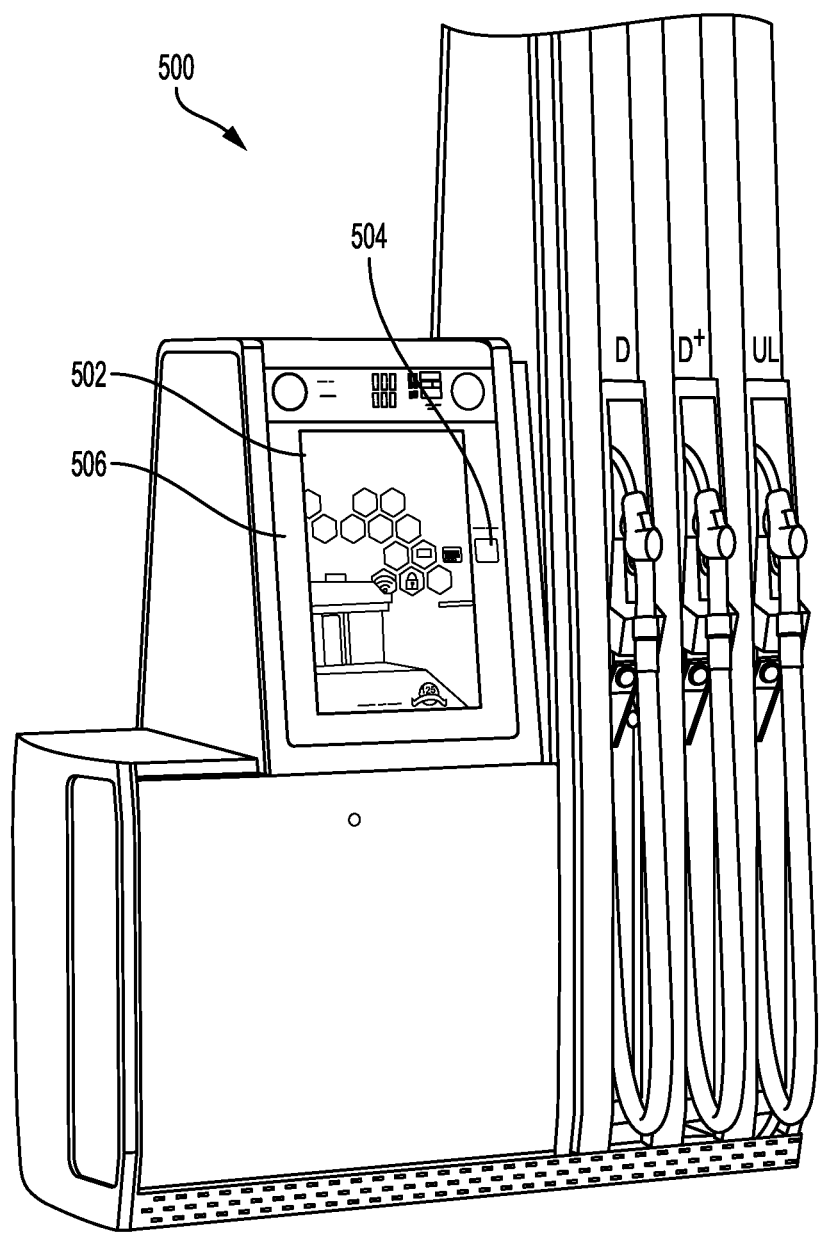
FIG. 8 is a perspective view of a portion of one embodiment of a fuel dispenser including a biometric reader and a display.

FIG. 8 illustrates one embodiment of a fuel dispenser 500 that includes a biometric reader 504 configured to read a biometric feature of a customer, in this case a palm for vascular scanning. One embodiment of a method for fuel dispensing is described below with respect to FIGS. 8-12. The method is described with respect to the fuel dispenser 500 of FIG. 8, but the method can be performed using any fuel dispenser. The method is described with respect to a display 502 on a front side of the fuel dispenser 500 for convenience of discussion but can be similarly implemented on a display (obscured in FIG. 8) on a back side of the fuel dispenser 500. It is possible for the graphics, text, images, video, etc. shown on the display 502 in various ones of FIGS. 8-12 to be different (e.g., be in a different language, include information in more than one language, include different icon symbols, show information in text instead of in a graphic, show information in a graphic instead of in text, etc.) and/or to be arranged in a different way on the display 502 (e.g., advertisements in different locations on the display 502, fueling progress shown on a bottom of the display 502 instead of on a top of the display 502, etc.).

The biometric reader 504 configured to read a palm for vein pattern matching can have any of a variety of configurations. The biometric reader 504 can include PalmSecure® available from Fujitsu of Tokyo, Japan, although other configurations are possible. The biometric reader 504 is can be to a frame 506 surrounding the display 502 on one side of the display 502 as in this embodiment, but the biometric reader 504 can be attached to other locations on the frame 506 or to the dispenser 500 at a location other than the frame 506.

Prior to the display 502 receiving power and/or prior to the fuel dispenser 500 being activated as ready to begin dispensing fuel, the display 502 can be in an off configuration.

Figure 9:
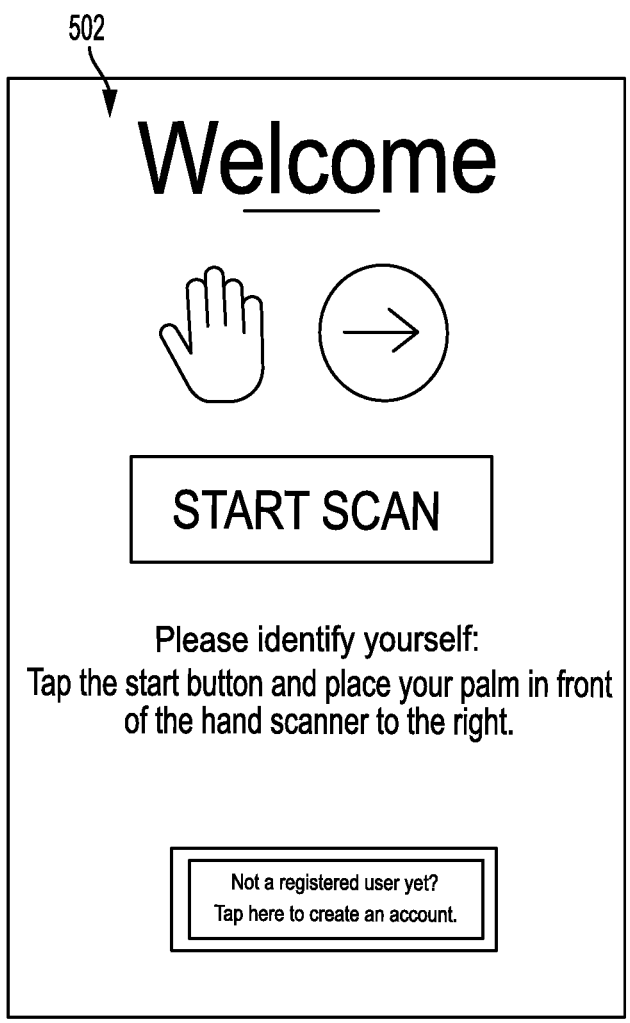
FIG. 9 is a perspective view of the display of FIG. 8 with a customer verification screen thereon.

FIG. 9 shows a customer verification screen on the display 502 requesting verification of the customer's identity using the biometric reader 504. The customer verification screen instructs the customer to tap a start button on the display 502, which in the illustrated embodiment is a touchscreen, and to place their palm in front of the biometric reader 504. Tapping the start button signals the biometric reader 504 to begin scanning. The customer placing their palm in front of the biometric reader 504 to verify their identity is an example of a no-touch input to the dispenser 500 to verify the customer's identity.

If the customer is a registered user, the biometrics read by the reader 504 can be verified because the customer's read biometric information can be compared with biometrics data stored in a database accessible to the fuel dispenser 500 (e.g., in a memory on board the dispenser 500, in a memory external to the dispenser 500 such as a memory at a remote server available to the dispenser 500 via a wireless communication, etc.). If the customer is not yet a registered user, the biometrics read by the reader 504 cannot be verified because the customer's biometric information will not be stored in the database accessible to the fuel dispenser 500. The customer verification screen can include an option for the customer to become a registered user by tapping on a button on the display 502. The customer can be prompted via the display 502 to become a registered user after the biometrics reader 504 reads customer data that is found to not match any of the stored customer biometrics data.

Figure 10:
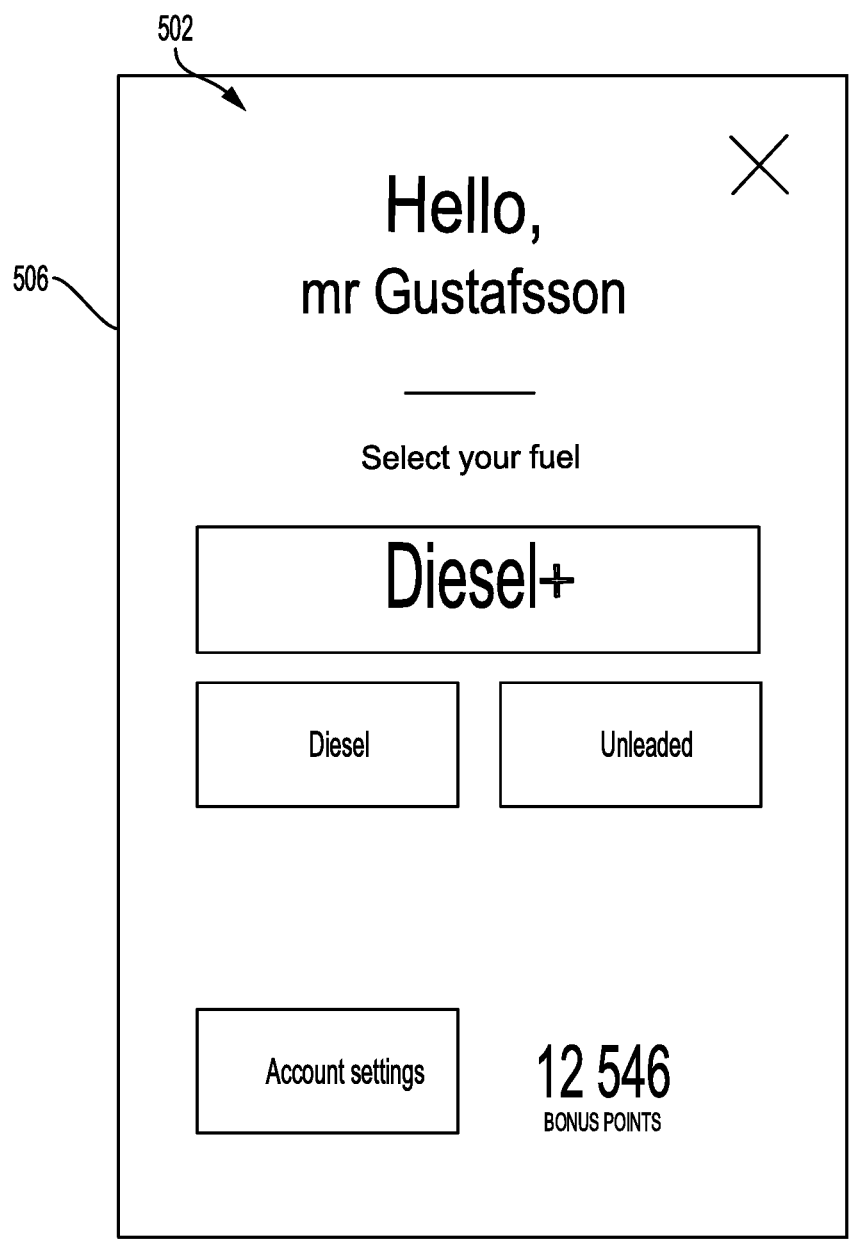
FIG. 10 is a perspective view of the display of FIG. 8 with a fueling preferences screen thereon.

In response to verification of the customer's identity, the display 502 can switch from the customer verification screen to a fueling preferences screen, shown in FIG. 10. The fueling preferences screen can show one or more fuel grades available at the dispenser 500 and can indicate the customer's preferred one of the fuel grades by highlighting that fuel grade (shaded box for Diesel+, as compared to unshaded boxes for Diesel and Unleaded). The fueling preferences screen can also show loyalty information associated with the customer.

Figure 11:
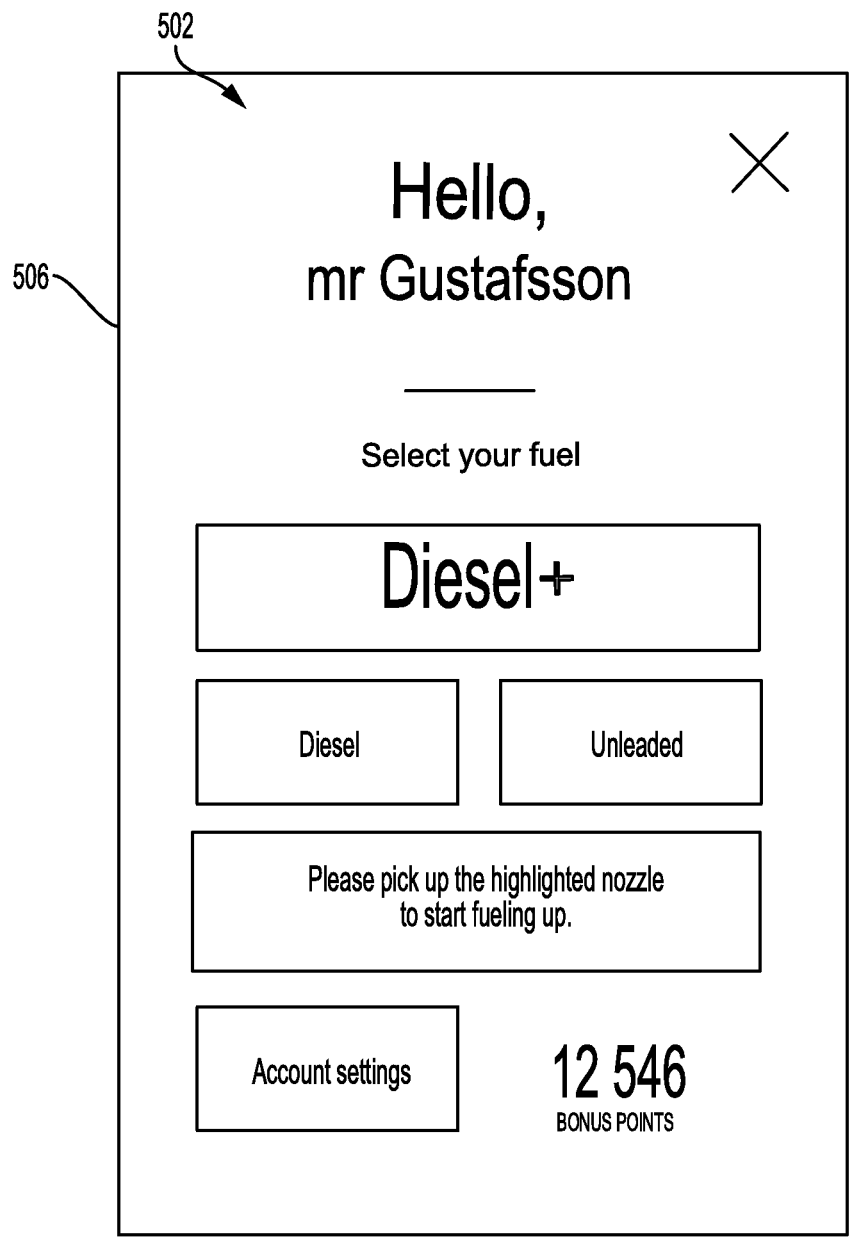
FIG. 11 is a perspective view of the fueling preferences screen on the display of FIG. 10 following customer selection of a fuel type.
Figure 11A:
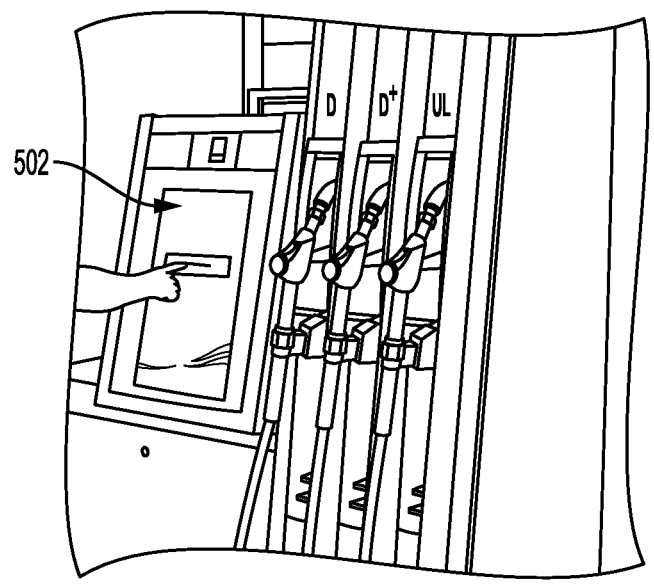
FIG. 11A is a perspective view of a portion of the fuel dispenser of FIG. 10 with lights illuminated by each nozzle of the dispenser.
Figure 11B:
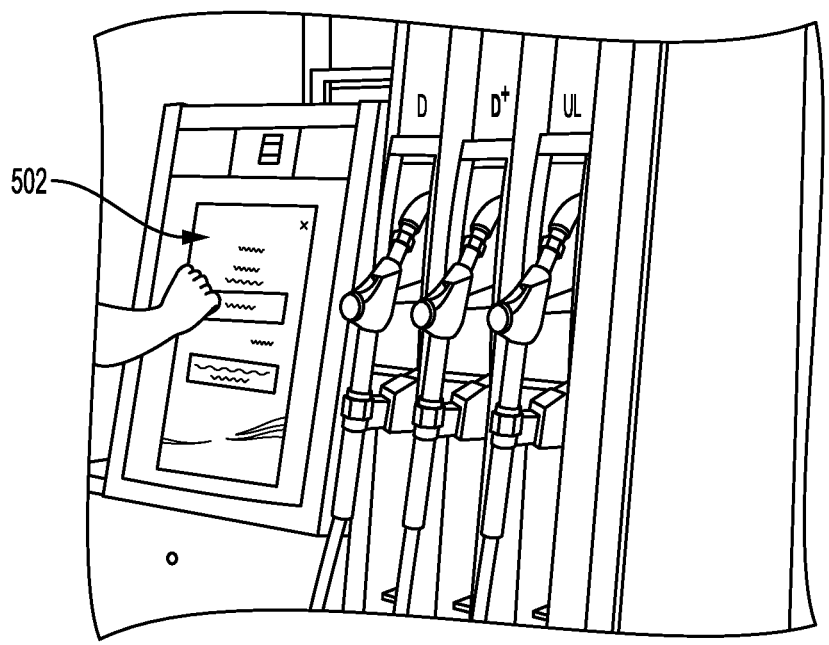
FIG. 11B is a perspective view of a portion of the fuel dispenser of FIG. 11 with the light by one of the nozzles illuminated.

As shown in FIG. 11, customer selection of one of the fuel grades (e.g., by tapping on the fuel grade button on the touchscreen display 502) can trigger the display 502 to show an option for the customer to adjust account settings, such as to change or enter a new payment method, update address information, etc., and can trigger the display 502 to show instructions on how to begin fueling, by picking up the nozzle highlighted by an illuminated light adjacent thereto. FIG. 11A illustrates an embodiment of a light feature adjacent to the nozzle for each of the available fuel grades, where the light illuminates before or when the customer selects one of the fuel grades. In another embodiment, all of the lights adjacent to nozzles for each of the available fuel grades can be unilluminated before customer selection of one of the fuels. FIG. 11B illustrates the one of the lights illuminated corresponding to the customer's selected fuel, which is Diesel+ in this illustrated embodiment, prior to the customer picking up the nozzle.

Figure 12:
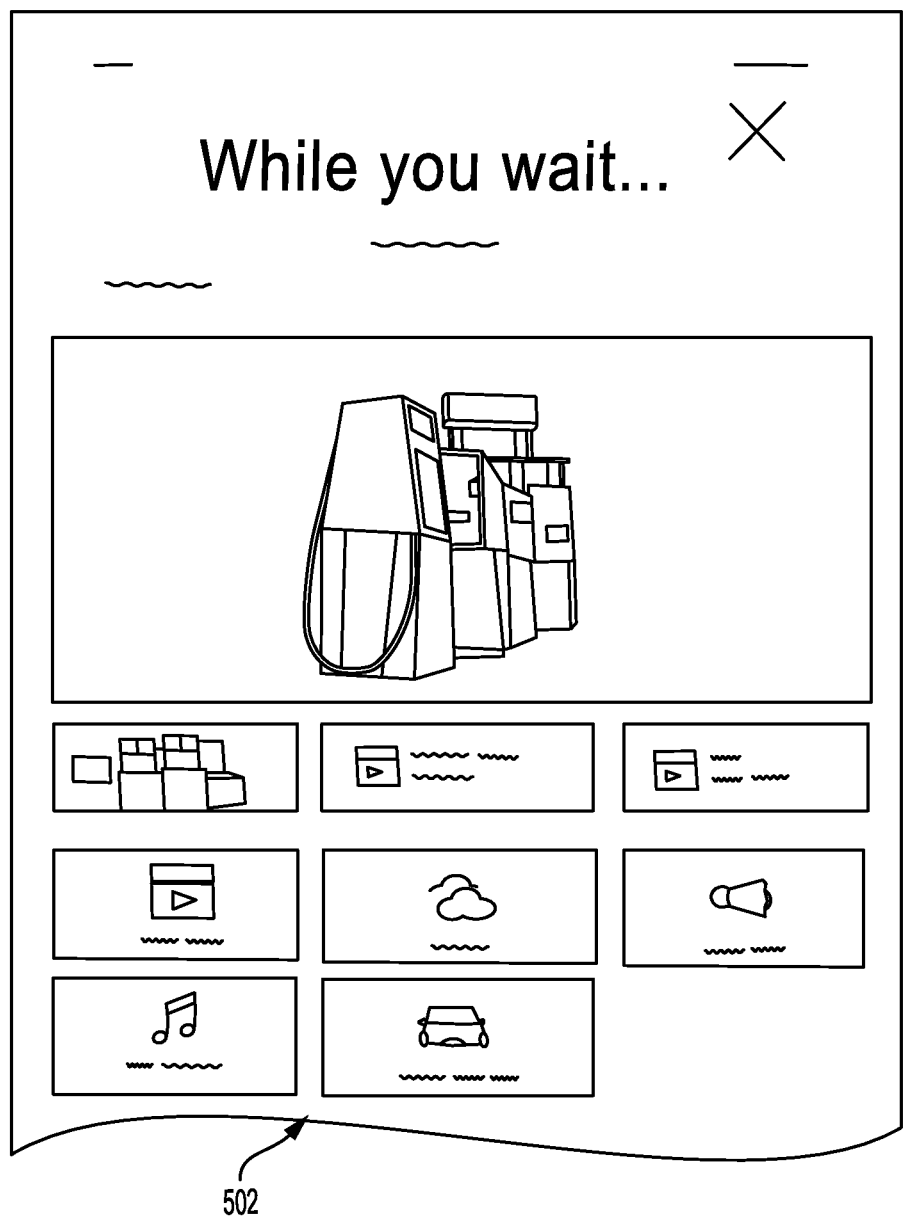
FIG. 12 is a perspective view of the display of FIG. 11 with a fueling screen thereon.

The customer's removal of the nozzle from its nozzle boot can trigger the start of fueling and can cause the display 502 to switch from the fueling preferences screen to a fueling screen, shown in FIG. 12. The removal of the nozzle from the nozzle boot can be detected in any number of ways, as will be appreciated by a person skilled in the art, such as by a sensor (e.g., a pressure sensor, a motion sensor, etc.) sensing the nozzle's removal. The fueling screen can display information thereon to the customer with customer-selectable options to view other types of information including video information about the dispenser 500, weather, latest news, entertainment (music, TV, etc.), vehicle information, etc.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A fuel dispenser, comprising:
   a housing having fuel dispensing components disposed therein;
   a control system in the housing for controlling the dispensing of fuel;
   a graphical display located on the housing, the graphical display comprises a front graphical display on a front side of the housing, and the graphical display having a transparent mode in which at least a portion of the display is transparent to allow viewing from a front of the housing, through the display, to outside a rear of the housing, and a media mode in which graphical information is present on the display and is visual to a user; and a rear graphical display on a back side of the housing configured to be transparent simultaneously with the front graphical display being in the transparent mode to allow an unobstructed view through the front and rear graphical displays.

2. The fuel dispenser of claim 1, wherein the graphical display is configured to transition between the transparent mode and the media mode in response to a trigger.

3. The fuel dispenser of claim 2, wherein the trigger comprises a touch screen on the graphical display that, when touched, causes the graphical display to transition from the transparent mode to the media mode.

4. The fuel dispenser of claim 2, wherein the trigger comprises a fixed amount of time after a last interaction between a customer and the fuel dispenser that, when activated, causes the graphical display to transition from the media mode to the transparent mode.

5. The fuel dispenser of claim 2, wherein the trigger is selected from a button on the fuel dispenser, a switch on the fuel dispenser, a keyboard on the fuel dispenser, a motion sensor, a pressure sensor, a sound sensor, a video camera, and a payment device on the fuel dispenser that, when touched, causes the graphical display to transition from the transparent mode to the media mode.

6. The fuel dispenser of claim 1, wherein a curtain is located in the housing and is configured to extend behind the graphical display in the media mode and retract in the transparent mode.

7. The fuel dispenser of claim 1, further comprising a biometrics reader; and a processor configured to receive biometrics data from the biometrics reader, configured to determine identity information of a customer using the biometrics data, and configured to cause the fuel dispenser to perform an action using the identity information.

8. The fuel dispenser of claim 7, wherein the biometrics reader is configured to read at least one of a fingerprint, an eye pattern verification, a palm print, DNA, hand geometry, and vein pattern.

9. The fuel dispenser of claim 7, wherein the processor is configured to cause the biometrics data to be transmitted to a remote database for determining whether the biometrics data matches a customer identity.

10. The fuel dispenser of claim 7, wherein the processor is configured to determine whether the biometrics data matches a customer identity.

11. The fuel dispenser of claim 7, wherein, based on the determined identity information of the customer, a characteristic of the customer including at least one of age, height, gender, and disability status is identified.

12. The fuel dispenser of claim 11, wherein the processor is configured to dynamically reconfigure at least one graphical user interface (GUI) element in the graphical display, the GUI element having at least one of a reconfigured location and a reconfigured size determined using the determined characteristic of the customer.

13. The fuel dispenser of claim 7, wherein the processor is configured to provide the determined identity information of the customer to a remote processor for determining the customer's identity that includes a name or unique identifier.

14. The fuel dispenser of claim 1, wherein the graphical display in the transparent mode also allows viewing from the rear of the housing, through the display, to outside the front of the housing.

15. A fuel dispenser for dispensing fuel to a vehicle, comprising:

a housing having a mechanical base portion including at least one fuel dispensing component; and an electronic head including
a processor configured to control the at least one fuel dispensing component,
a front graphical display mounted on a front side of the housing, and
a rear graphical display mounted on a rear side of the housing, the front and rear graphical displays being configured to selectively display media, and being configured to be simultaneously transparent to allow viewing from a front of the housing, through the front graphical display and the rear graphical display, to a rear of the housing.

16. The fuel dispenser of claim 15, wherein the media is displayed on a portion of the front and rear graphical displays and a portion of the front and rear graphical displays are transparent.

17. The fuel dispenser of claim 15, further comprising a trigger configured to cause the front and rear graphical displays to become transparent.

18. The fuel dispenser of claim 15, further comprising at least one curtain in the electronic head and configured to prevent viewing from the front of the housing, through the front graphical display and the rear graphical display, to the rear of the housing when the front and rear graphical displays are displaying media, and configured to allow viewing from the front of the housing, through the front graphical display and the rear graphical display, to the rear of the housing when the front and rear graphical displays are simultaneously transparent.

19. The fuel dispenser of claim 15, wherein, with the front and rear graphical displays simultaneously transparent, the view is unobstructed from outside the front side of the housing to outside the rear side of the housing.

20. A method of interacting with a fuel dispenser display, comprising:

activating a fuel dispenser to cause a graphical display on the fuel dispenser to display media, and to cause the fuel dispenser to dispense fuel, the graphical display being transparent, when no media is being displayed, to allow viewing from outside a front side of the dispenser, through the dispenser, to outside a rear side of the dispenser;

wherein the graphical display comprises a front graphical display on a front side of the housing, and wherein a rear graphical display on a back side of the housing is configured to be transparent simultaneously with the front graphical display being transparent to allow an unobstructed view through the front and rear graphical displays.

21. The method of claim 20, wherein activating the fuel dispenser includes activating a trigger to cause the graphical display to display media.

22. The method of claim 21, wherein activating the trigger includes touching a touch screen.

23. The method of claim 21, wherein the trigger is selected from a button on the fuel dispenser, a switch on the fuel dispenser, a keyboard on the fuel dispenser, a motion sensor, a pressure sensor, a sound sensor, a video camera, and a payment device on the fuel dispenser.

24. The method of claim 20, wherein activating the fuel dispenser includes activating a trigger including waiting a fixed amount of time after a last interaction between a customer and the fuel dispenser that, when activated, causes the graphical display to become transparent.

25. The method of claim 20, wherein activating the fuel dispenser also activates a curtain that blocks a back of the graphical display when displaying media, the curtain configured to retract into the fuel dispenser when the graphical display is transparent.

26. The method of claim 20, wherein the view is unobstructed from outside the front side of the dispenser, through the dispenser, to outside the rear side of the dispenser.

* * * * *